Patented Apr. 1, 1941

2,237,240

UNITED STATES PATENT OFFICE 2,237,240

WATER-SOLUBLE COLLOIDS OF UREA-ALDEHYDE - CARBOHYDRATE ETHER PRODUCTS

Kurt Sponsel, Wiesbaden-Biebrich, Germany, assignor to Kalle & Co. Aktiengesellschaft, Wiesbaden-Biebrich, Germany No Drawing. Application September 29, 1937, Serial No. 166,325. In Germany October 1, 1936

7 Claims. (Cl. 260—15)

The invention relates to new colloids suitable for various technical purposes.

The well known condensation of urea with formaldehyde has been conducted in the presence of other substances, for example water-insoluble condensation products have been made by condensing urea with formaldehyde in the presence of wood, sawdust, straw or the like.

One object of the invention is the production of commercially valuable water-soluble colloidal condensation products by condensing urea with formaldehyde in the presence of water-soluble ethers of cellulose or another highly polymeric carbohydrate resembling cellulose in aqueous solution. Instead of mixtures of urea with formaldehyde also lower molecular water-soluble condensation products of these substances may be employed if desired. For example, the condensation may be conducted in the presence of water-soluble methyl cellulose, ethyl cellulose, hydroxy-ethyl-methyl cellulose, methyl cellulose glycollic acid, hydroxy-ethyl cellulose glycollic acid or the like; also ethyllichenine carboxylic acid is suitable. Instead of formaldehyde, glyoxal may be used, and instead of urea a derivative or a substitution product thereof, for instance thiourea, phenylated or acetylated urea or the like, in so far as these have the essential property of condensing with formaldehyde. Filling materials, for instance sugar, may be present in the condensation if desired.

The operation of condensation is conducted in known manner by causing the mixed products to react, while stirring and preferably while heating. The temperature necessary depends on the reactivity of the parent materials and frequently the mixture undergoing the reaction becomes spontaneously hot. In general, the working temperature is about 70–80° C. Acids may be used as catalysts, if desired. Also alkali may be used as catalyst; one may work, for example, at pH=8. Generally, however, the reaction proceeds well without the use of a catalyst. The condensation may be between 1 mol of urea and 1 mol of formaldehyde, for example. Preferably, however, a somewhat larger quantity of urea is employed, for example 1.5–2.5 mol of urea per 1 mol of formaldehyde. Good results are obtained by causing to react 2 mol of urea and 1 mol of formaldehyde. The proportion of the water-soluble cellulose derivative may vary within wide limits. If, for example, there is used 1 mol of urea, 1 mol of formaldehyde and 1 mol of hydroxy-ethyl-methyl cellulose, there is obtained a product the aqueous solutions of which are still somewhat similar to solutions of hydroxy-ethyl-methyl cellulose. If the proportion of hydroxy-ethyl-methyl cellulose is decreased and only ¼ mol or indeed 1/10 mol of hydroxy-ethyl-methyl cellulose is used per 1 mol of urea, there is obtained a product of more resinous character which is especially suitable as a filling material for soaps. For example, for 100 parts of a normal stock soap containing 70–80 per cent of fatty acids, 5–30 parts of a condensation product may be used. The materials are mixed with each other in the form of shavings and then made up. According to the proportions of the products used for the reaction, the temperature of the reaction, the kind of catalyst and the like, products varying from slightly viscous ropy colloids to highly viscous thixotropic colloids may be obtained.

The products made by the invention are applicable in various ways according to the mode of preparation, for example they are useful as adhesives or binding agents, also as thickening, impregnating and dressing agents. Their most important application is as additions to soaps and washing agents.

The following examples illustrate the invention:

Example 1

75 kilos of hydroxy-ethyl-methyl cellulose of low viscosity are introduced into a kneading machine together with 225 kilos of boiling water. After the mass has cooled to about 50° C. there are added in portions 300 kilos of urea, whereupon the temperature rapidly falls. To the homogeneous solution thus produced there are added gradually 180 kilos of commercial formaldehyde solution of 35 per cent strength and while stirring continuously there are further added gradually 8 kilos of commercial concentrated nitric acid, whereupon the mixture becomes spontaneously heated. The condensation is carried through at about 60° C. and is finished after about 4 hours. The product obtained may be neutralised with ammonia or used directly. Neither the neutralised nor the acid material which has a pH value of about 3 tends to any further polymerisation in the course of 6 months. The mentioned hydroxy-ethyl-methyl cellulose may contain 1 mol of hydroxy-ethyl and 1 mol of methyl per 1 mol of cellulose ($C_6H_{10}O_5$) or 0.5 mol of oxethyl and 1.5 mol of methyl per 1 mol of cellulose ($C_6H_{10}O_5$). These statements are, however, only given by way of example.

Example 2

500 grams of a commercial water-soluble hydroxy-ethyl-methyl cellulose (viscosity 25 measured by the Cochius method), 2200 grams of urea, 1200 grams of formaldehyde solution of 30 per cent strength, 1000 grams of commercial crystallised magnesium chloride, 50 grams of nitric acid, 8 grams of caustic soda lye of 50 per cent strength and 5250 grams of water are mixed and subjected to condensation as described in Example 1. There is obtained a product excellently suitable as sheet glue and having a pH value of 1.83, a final viscosity of 39 and there is a content of 33.7 per cent of dry matter.

*Example 3*

7.5 parts by weight of a highly viscous methyl-hydroxy-ethyl cellulose are made into a paste with 40.5 parts of water and thoroughly stirred. There are then added firstly 50.5 parts of commercial urea and then in small portions 10.5 parts of formaldehyde of 100 per cent strength (paraformaldehyde). When the whole has been uniformly mixed it is heated to 75–85° C. In the course of about 4–6 hours while stirring the condensation is finished.

*Example 4*

To a mixture of 175 grams of sodium methyl cellulose glycollate, 60 grams of urea and 520 grams of water there are added, after complete dissolution has occurred, 100 grams of formaldehyde solution of 30 per cent strength; the condensation is then conducted. Instead of the sodium methyl cellulose glycollate, for example, also the potassium methyl cellulose glycollate may be used.

*Example 5*

75 grams of hydroxy-ethyl-methyl cellulose, 225 grams of water and 300 grams of urea are mixed as described in Example 1 and 180 grams of formaldehyde of 30 per cent strength are added. The condensation is conducted with addition of 15 grams of sodium hydroxide of 50 per cent strength. The product obtained has a content of 50 per cent of dry matter. It is suitable as a binding agent for coatings. It is stable to dilute acids, alkalis and caustic lime and glasslike transparent.

*Example 6*

40 grams of a water-soluble ethyllichenine carboxylic acid are mixed with 120 grams of water and 170 grams of urea. After addition of 100 grams of formaldehyde solution of 30 per cent strength and 20 grams of citric acid the condensation is carried through while stirring; when it is complete, there is added about 30 grams of a solution of ammonia of 20 per cent strength, whereby a neutral pasty product is obtained. If magnesium chloride is added to the condensation mixture as well as the citric acid, there is obtained a product having a high sticking capacity.

*Example 7*

87 grams of hydroxy-ethyl-methyl cellulose, 260 grams of water and 120 grams of urea are mixed as described in Example 1 and 40 grams of glyoxal are added. The condensation is conducted with addition of 2 grams of dilute sulphuric acid (2 N). The product obtained has a content of 50 per cent of dry matter and pH value 2. It is suitable as a binding agent for coatings. It is stable to dilute acids, alkalis and caustic lime. Instead of the mentioned hydroxy-ethyl-methyl cellulose also, for example, methyl cellulose may be employed.

I claim:

1. As new products water-soluble colloids obtained by condensing a substance selected from the group consisting of urea thiourea, phenylurea and acetylurea with a substance selected from the group consisting of formaldehyde and glyoxal in presence of a water-soluble ether of a highly polymeric carbohydrate in aqueous solution while stirring said products being incapable of polymerizing to a water-insoluble state.

2. As new products water-soluble colloids obtained by condensing a substance selected from the group consisting of urea thiourea, phenylurea and acetylurea with a substance selected from the group consisting of formaldehyde and glyoxal in presence of a water-soluble cellulose ether in aqueous solution while stirring said products being incapable of polymerizing to a water-insoluble state.

3. As new products water-soluble colloids obtained by condensing urea and formaldehyde while stirring in presence of a water-soluble cellulose ether in aqueous solution, wherein more than one mol of urea is used per one mol of formaldehyde said products being incapable of polymerizing to a water-insoluble state.

4. As new products water-soluble colloids obtained by condensing 1.5 to 2.5 mol of urea and 1 mol of formaldehyde while stirring in presence of a water-soluble cellulose ether in aqueous solution said products being incapable of polymerizing to a water-insoluble state.

5. As new products water-soluble colloids obtained by condensing 2 mol of urea and 1 mol of formaldehyde while stirring in presence of a water-soluble cellulose ether in aqueous solution said products being incapable of polymerizing to a water-insoluble state.

6. As new products water-soluble colloids obtained by condensing 2 mol of urea and 1 mol of formaldehyde while stirring in presence of a water-soluble hydroxy-ethyl-methyl cellulose in aqueous solution said products being incapable of polymerizing to a water-insoluble state.

7. As new products water-soluble colloids obtained by condensing 2 mol of urea and 1 mol of formaldehyde while stirring in presence of a water-soluble alkali salt of a methyl-cellulose glycollic acid in aqueous solution said products being incapable of polymerizing to a water-insoluble state.

KURT SPONSEL.